March 24, 1931. J. M. CALKINS 1,798,062
DIRIGIBLE HEADLIGHT
Filed Aug. 19, 1929
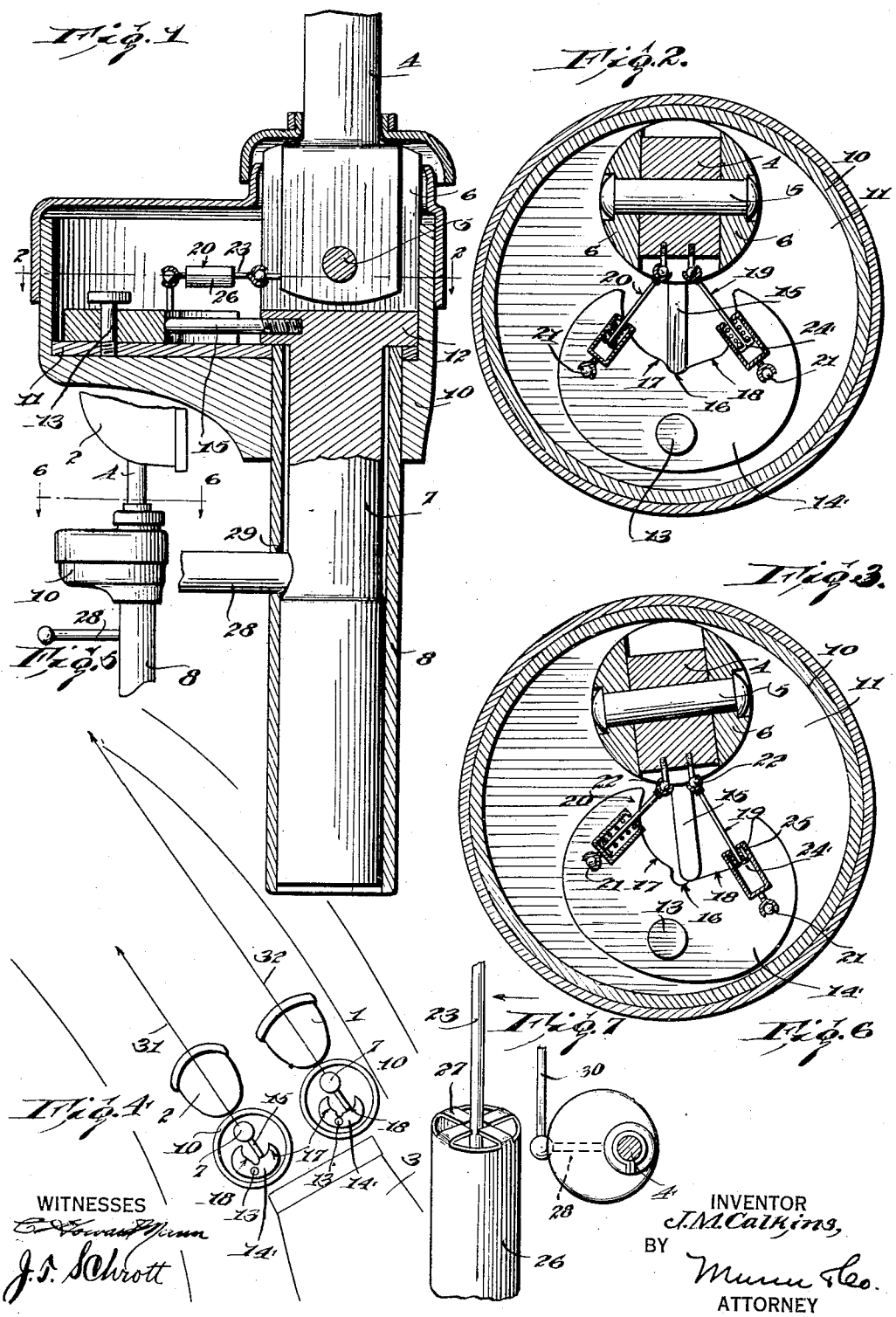
INVENTOR
J. M. Calkins,
BY
ATTORNEY
WITNESSES Patented Mar. 24, 1931

1,798,062

UNITED STATES PATENT OFFICE

JAMES M. CALKINS, OF MIAMI, FLORIDA

DIRIGIBLE HEADLIGHT

Application filed August 19, 1929. Serial No. 387,066.

This invention relates to improvements in dirigible headlights for vehicles, and it consists of the constructions, combinations and arrangements herein described and claimed.

An object of the invention is to provide means for causing one of the headlights of a pair of headlights on the front of a motor vehicle to swing or dip to an extent differently from that of the other so that the respective beams of light are particularly directed to the near shoulder and to the farther reaches of one side of the road, thus enabling the driver to see the shoulder as he negotiates a curve as well as see the adjoining farther reaches of the road which he is about to traverse.

Another object of the invention is to provide a headlight-actuating means in which a novel cam mechanism is embodied to produce the foregoing effects upon the headlights under the conditions named.

Other objects and advantages will appear in the following specification, reference being had to the accompanying drawing, in which:—

Figure 1 is a vertical section of the actuating means of the right headlight, parts being shown in elevation;

Figure 2 is a horizontal section taken on the line 2—2 of Figure 1, the cam mechanism being in a position agreeing with a forwardly directed position of the headlight;

Figure 3 is a horizontal section illustrating the change in position of the cam mechanism when the headlight is turned to the left;

Figure 4 is a diagrammatic view illustrating the effect of differently swinging or dipping the two headlights upon their pivots;

Figure 5 is a detail side elevation of the actuating means and a portion of the headlight which is actuated;

Figure 6 is a horizontal section taken on the line 6—6 of Figure 5; and

Figure 7 is a detail perspective view of a portion of one of the yieldable connections embodied in the cam mechanism.

This invention is an improvement on the dirigible headlight for vehicles disclosed in Patent No. 1,569,261, granted to J. M. Calkins, January 12, 1926, and particularly on the dirigible headlight disclosed in an application filed by J. M. Calkins, August 19, 1929, Serial No. 387,065. The underlying purpose of the foregoing and present applications is to swing or dip each of a pair of headlights differently from the other so that one will throw a beam of light more directly upon the road, thus to illuminate the road at a point nearer to the vehicle. This various swinging or dipping of the headlights is for the purpose of so illuminating the near shoulder and the farther reaches of the adjacent portion of the road when steering around a curve that the driver will have an adequate sight of the road before him and will never encounter the possibility of running into an obstruction by virtue of an inadequate illumination of these important sections of the road.

The right and left headlights, when so considered in reference to the driver of the motor vehicle, are designated 1 and 2. These are mounted on front of the vehicle 3. The showing of the headlights as well as the cam mechanism is purposely distorted in Figure 4 in order to picture to better advantage the effects upon the headlights by the changes in the cam mechanism upon making a turn of the vehicle. The actual construction is best understood by consulting the true sectional views.

An arm 4, of any shape or style, supports a headlight and is herein known as the headlight supporting arm. It is capable of limited forward and return swinging or dipping movement upon a pin 5 by which it is pivoted in the fork 6 of a lamp-actuating rod 7. The latter has means by which it can be turned or rotated, and this rotation is imparted to the supporting arm 4, and hence the headlight, by virtue of the pin connection 5.

A tubular shank 8 contains the lamp-actuating rod 7. The shank is immovably fixed to a bracket (not shown) which, in turn, is secured to the framework of an automobile. The upper end of the shank is secured in a casing 10 on the bottom of which a base plate 11 is located. The upper end of the tubular shank extends into the base plate, the top surface of the latter and the upper end of the former being flush. A hub 12 from which the fork 6 arises and which comprises an oversize part of the rod 7 has bearing on the upper end of the shank as well as adjoining parts of the base plate.

A stud 13 pivotally secures a cam 14 to the base plate. The cam is capable of limited rocking motion to one side or the other under the influence of a finger 15 when the actuating rod 7 is rotated to the right or left. The finger is secured to the hub 12 from which it protrudes toward the cam 14. The cam surfaces comprise a recess 16 which is occupied by the free end of the finger when the lamp assumes a true forward position. A crest 17 at one side of the recess causes a decided swinging or dipping of the headlight upon its pivot 5 when the actuating rod 7 is rotated in one direction, while a landing 18 on the other side produces a lesser swinging or dipping of the headlight when the rod is rotated in the opposite direction.

The landing 18 is either level or substantially so, any deviation comprising a striking of the surface on the arc of a circle of which the center falls on the axis of the rod 7.

Thus far it is plain that a turn of the rod 7 in either direction will compel a turn of the cam 14 upon its pivot in the opposite direction. For example, when the right headlight 1 is turned to the left the actuating means will assume the position in Figure 3, the action of the finger 15 being to urge the cam 14 to the right, but inasmuch as it rides upon the shallow landing 18, the cam is given but a slight turn, resulting in a relatively shallow dipping of the headlight 1. Rotation in the other direction will produce a reverse effect, the dipping of the headlight then being deeper.

The motions of the cam 14 are transmitted to the supporting arm 4 by yieldable connections 19 and 20. The opposite ends of each of these have ball-and-socket connections at 21 and 22, respectively, with the cam 14 and the lower part of the arm 4 at a point below the pivot 5. As the cam 14 is turned to the right (Figure 3) the resulting pull on the connection 19 will turn the supporting arm 4 on its pivot 5 to produce the shallow dipping of the headlight mentioned above. A turn of the cam to the left will cause a pull on the connection 20 so that the arm 4 makes the deep dip.

Any type of yielding means may be embodied in the connections 19 and 20. The specific means shown comprises a rod 23 (Figure 7) which is split and spread at 24 (Figure 3) to constitute a support for one end of a spring 25 that is situated in a tube 26 in which the rod works. One end of the tube has structure that forms a part of the ball-and-socket connection, while the other end is formed into lugs 27 (Figure 7) which are bent over to retain the spring and support the other ends. The lugs 27 are brought together to produce a square opening in which the rod 23 has bearing.

In practice, any proper means will be used to produce a simultaneous turning of the headlights when the vehicle is steered to the right or left. Reference may be had to the foregoing application, Serial No. 387,065, for an exemplification of such means. This will include an arm 28 protruding from the rod 7 through an arcuate slot 29 in the tubular shank 8. A reach rod 30 has swivelled connections at its end with the arm 28 and with a similar arm on the rod 7 of the companion headlight.

The operation is readily understood. When steering the vehicle straight ahead the headlights 1 and 2 will assume a true forwardly directed position. At such time, the finger 15 of each headlight-actuating means will occupy the recess 16 (Figure 2) of the associated cam 14. While the cam surfaces of each of the two cams are identical in configuration, they are disposed reversely in reference to each other, as shown in Figure 4. The landing 18 of the cam of the right headlight 1 comes next to the right side of the vehicle, whereas in the instance of the left headlight 2 the crest 17 is at the right. Thus it will be the landing 18 in the instance of the right headlight and the crest 17 in the instance of the left headlight that will have the controlling effect upon the swinging of the headlights when the latter are simultaneously rotated to the left.

Assume the vehicle to be steered around a left curve as shown in Figure 4. The finger 15 of the left headlight-actuating mechanism will ride upon the chest 17, producing a large deflection of the cam 14 and a corresponding large pull upon the connection 20. This will produce a decided swinging or dipping of the arm 4 of the headlight 2 so that the light beam is deflected sharply to the road, as indicated by the arrow 31. By the same action, the finger 15 of the right headlight will ride upon the landing 18, producing a lesser deflection of the cam and a correspondingly lesser pull on the connection 19 so that the headlight 1 is deflected less sharply toward the road, as indicated by the arrow 32.

The effect of these variable actions is to adequately illuminate the right shoulder as well as the adjoining inner portion of the road. Continued riding of the finger 15 over the landing 18 will have no further deflecting effect upon the headlight than in its control, the rotation of that headlight continuing in a horizontal plane upon further turning of the vehicle. But in the instance of the crest 17, further turning of the vehicle will slightly increase the deflection of the headlight under its control. This is due to the curved shape of the cam surface with which the crest 17 merges.

Upon steering the vehicle to the right as in rounding a right curve, the reverse effects will follow. The finger 15 of the right headlight-actuating mechanism will then ride upon the crest 17 of the right cam 14, giving the headlight 1 the sharp deflection. At the same time the finger 15 of the left headlight-actuating mechanism will ride upon the shallow landing 18 of the left cam, giving the left headlight 2 a lesser deflection. It is thus that the near right shoulder would be illuminated as well as the adjoining portions of the road along the farther reaches thereof.

While the construction and arrangement of the improved dirigible headlight is that of a generally preferred form, obviously modifications and changes may be made without departing from the spirit of the invention and the scope of the claims.

I claim:—

1. A dirigible headlight construction comprising a rotatable and pivoted headlight supporting arm, means which is shiftable when the arm is rotated, and a connection between the arm and said means causing pivotal motion of the arm by the shifting of said means.

2. A dirigible headlight construction comprising a rotatable and pivoted headlight supporting arm, means which is rotated when the arm is rotated, and a connection between said means and the arm causing pivotal motion of the arm by the rotation of said means.

3. A dirigible headlight construction comprising a rotatable and pivoted headlight supporting arm, a finger rotatable with the arm, means which is shifted by the finger as the arm is rotated, and a connection between said means and the arm causing pivotal motion of the arm.

4. A dirigible headlight construction comprising a rotatable and pivoted headlight supporting arm, a finger rotatable with the arm, a rotatable cam having varying cam surfaces over which the finger plays to produce varying degrees of turning of the cam as the arm is rotated, and connections between the cam and the arm causing correspondingly varying pivotal motions of the arm.

5. A dirigible headlight construction comprising a rotatable and pivoted headlight supporting arm, a finger rotatable with the arm, a cam having a recess initially occupied by an end of the finger and having an adjoining crest and a substantially level landing, means upon which the cam is mounted to rock to a greater or lesser degree when the finger is made to ride upon either the crest or the landing when rotating the arm in one direction or the other, and connections between the cam and the arm causing a greater or lesser pivotal motion.

6. A dirigible headlight construction comprising a headlight supporting arm, a rotatable actuating rod by which the arm is pivotally carried, a cam having a crest and a substantially level landing, a finger carried by the rod moving over either the crest or the landing as the rod is turned in one or the other direction, means supporting the cam upon which the cam is moved in directions opposite to said turnings, and yieldable connections between the ends of the cam and said arm causing a degree of pivotal motion of the arm commensurate with the deflection of the cam by said finger.

7. In a dirigible headlight construction, a pivoted headlight supporting arm and a rockable cam which rocks to cause pivotal motion of the arm, and a connection between the cam and the arm by which said motion is imparted comprising a spring, a rod having a split and bent end upon which one end of the spring is rested, and a tube by which the spring is contained and into which the split end of the rod extends, said tube having bent lugs on one end upon which the opposite end of the spring is rested and which provide a bearing for the rod.

JAMES M. CALKINS.